I. KORNETSKY & D. P. SULLIVAN.
VALVE FOR PNEUMATIC TIRES.
APPLICATION FILED MAR. 28, 1918.
1,290,243.
Patented Jan. 7, 1919.
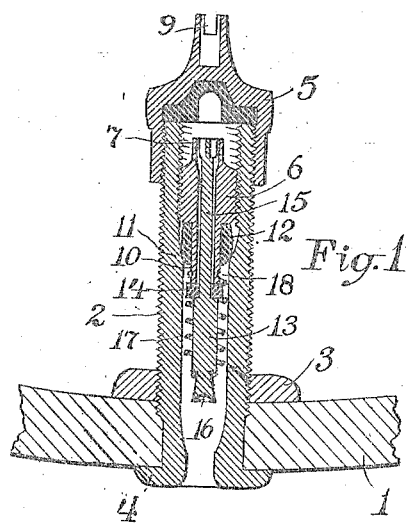
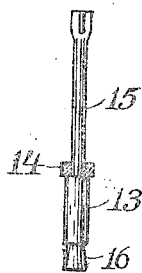
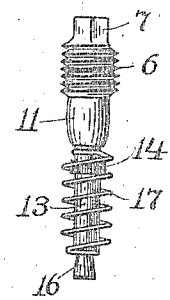
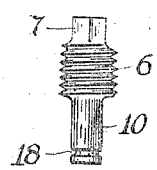
Inventors,
Israel Kornetsky,
Daniel P. Sullivan,

UNITED STATES PATENT OFFICE.

ISRAEL KORNETSKY, OF CHELSEA, AND DANIEL P. SULLIVAN, OF BOSTON, MASSACHUSETTS.

VALVE FOR PNEUMATIC TIRES.

1,290,243.  Specification of Letters Patent.  Patented Jan. 7, 1919.

Application filed March 28, 1918. Serial No. 225,173.

*To all whom it may concern:*

Be it known that we, ISRAEL KORNETSKY, of Chelsea, and DANIEL P. SULLIVAN, of Boston, in the county of Suffolk and Commonwealth of Massachusetts, both citizens of the United States, have invented certain new and useful Improvements in Valves for Pneumatic Tires, of which the following is a full, clear, and exact specification.

The object of this invention is the construction of a tire valve wherein the valve stem can be shorter than is now the case; which shall have fewer parts; which does not have to seat against the bottom of the valve stem; which can use a shorter spring, and shall have further advantages hereinafter set forth.

In the drawings forming part of this specification, Figure 1 is a central longitudinal section of a tire valve embodying our improvements. Fig. 2 is a side elevation of the valve alone. Fig. 3 is an elevation of the operative portion of the valve. Fig. 4 is an elevation of the valve seat member alone.

In Fig. 1, the reference numeral 1 designates a portion of a pneumatic tire; 2 is the valve stem attached to the tire by a nut 3 coacting with a shoulder 4; and 5 is the valve stem cap, the parts thus far recited being substantially like those now on the market.

The valve seat member 6 comprises an externally threaded body adapted to be screwed within the correspondingly threaded interior of the valve stem 2; a square portion 7 adapted to be engaged by the end 9 of the cap 5 for enabling it to be screwed in place, and a cylindrical portion 10 projecting below the threaded body for receiving a leather or rubber washer or tubular plug 12 which by its coaction with the constricted section of throat 11 of the stem 2, prevents the escape of air thereat. As shown in Fig. 1, this valve seat member is tubular throughout its length.

The valve comprises a cylindrical body 13 carrying a rubber washer 14 at its end from which rises a slender stem 15. At the lower end of the valve body 13 is a conical portion 16 recessed in its under surface.

A slender helical spring 17 surrounds the valve body 13, having one end gripping a groove 18 at the end of the cylindrical portion 10 of the valve seat member, the other end of the spring gripping the small end of the cone 16; the spring being adapted to resiliently pull the valve washer 14 into air tight engagement with the end of the portion 10, which composes the valve seat.

The interior of the squared portion 7 is made slightly larger than the remainder of the hole through the member 6, and the extremity of the stem 15 is flattened or made star-shape in a well known manner for preventing the valve from being pushed too far in the valve stem, this flattening being done after the stem has been introduced within the body.

The device is used in a well known manner, the advantages comprising sensitiveness due to the slender and short helical spring and the lack of any parts liable to bind or stick. The simplicity of the valve is seen in the fact that it consists of but five parts, whereas none with which we are acquainted have less than eight or nine. Although the valve stem as illustrated in Fig. 1 is shorter than almost all others, it is evident that several of the parts of the valve, as the tubular portion 10, the plug 11 and the body 13, can be materially shortened as compared with their proportions shown in the drawings, without in the slightest degree interfering with the operativeness of the valve. The concavity of the conical valve-end 16 is designed to aid the outward rush of air from within the pneumatic tire in closing the valve.

What we claim is:

1. A tire valve comprising a valve stem having a tubular member therein, a valve having a slender stem within the tubular member, the latter having an annular groove around its lower portion, the valve being elongated and formed with an annular depression at its lower end, and a helical spring having one end gripping said groove and its other end gripping said annular depression and yieldingly drawing the valve into air-tight engagement with the lower end of the tubular member.

2. A tire valve comprising a valve stem, a tubular member therein having an enlarged body for enabling it to be fastened in the stem, the lower portion of the tubular member being cylindrical and formed with an annular groove near its lower end, a yielding washer surrounding the upper portion of the said cylindrical portion for making an air-tight contact with the interior of the valve stem, a valve cylindrical in form and having a slender stem rising from one end through the said tubular member, a yielding washer about the lower part of said stem, the lower end of said valve being formed with a conical termination having its base below and concaved, its upper end being less in diameter than the valve, and a helical spring having one end gripping said groove and its other end gripping the conical projection immediately below the valve-end.

In testimony that we claim the foregoing invention we have hereunto set our hands this 25th day of March, 1918.

ISRAEL KORNETSKY.
DANIEL P. SULLIVAN.